W. GUMMERSON.
STEERING GEAR ATTACHMENT.
APPLICATION FILED JUNE 4, 1918.
1,310,159. Patented July 15, 1919.
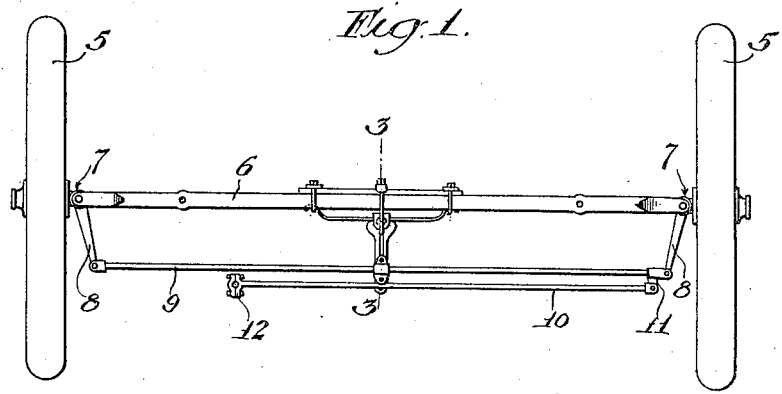
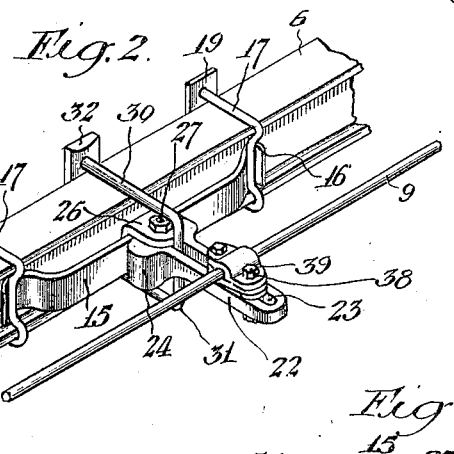
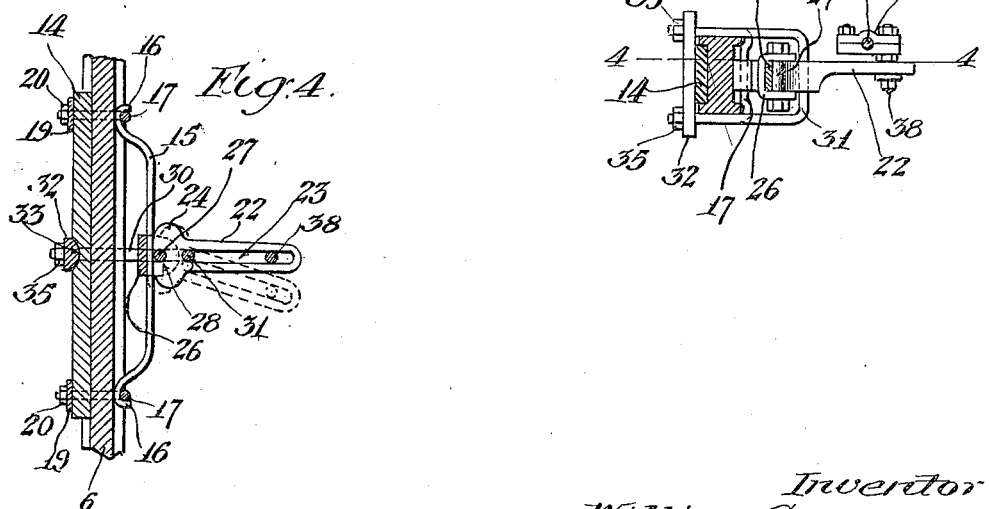
Inventor
William Gummerson
by Graham + Harris
Attorneys

UNITED STATES PATENT OFFICE.

WILLIAM GUMMERSON, OF LOS ANGELES, CALIFORNIA.

STEERING-GEAR ATTACHMENT.

1,310,159.   Specification of Letters Patent.   Patented July 15, 1919.

Application filed June 4, 1918. Serial No. 238,216.

*To all whom it may concern:*

Be it known that I, WILLIAM GUMMERSON, a citizen of the United States, residing at Los Angeles, in the county of Los Angeles and State of California, have invented a new and useful Steering-Gear Attachment, of which the following is a specification.

In some forms of automobiles the ordinary worm wheel connection between the steering wheel and the steering mechanism is not used, consequently the jarring and twisting of the front wheels of the vehicle due to the unevenness of the road is transmitted to a great extent to the steering wheel so that it is necessary to maintain a firm grip upon the steering wheel at all times. The vibrations so transmitted are very fatiguing to the driver, and one of the principal objects of my invention is to produce an attachment for the steering gear of the vehicle, of simple form and construction, which elastically maintains the front wheels of the vehicle is straightforward position thereby reducing the strain on the steering wheel and consequently removing a large portion of the strain on the driver.

Other objects and advantages will appear hereinafter from the following description.

Referring to the drawings, which are for illustrative purposes only,

Figure 1 is a plan view of a steering gear showing my attachment placed thereon.

Fig. 2 is an enlarged perspective view of a portion of the steering gear showing my attachment thereon.

Fig. 3 is an enlarged vertical sectional view on line 3—3, Fig. 1, and

Fig. 4 is a sectional plan view on line 4—4, Fig. 3.

5 designates the front wheel of an automobile, 6 the front axle, 7 the steering knuckles connecting the wheels 5 to the axle 6, and 8 designates arms on the steering knuckles which are connected by an equalizing rod 9 as is ordinarily done in automobile construction. 10 designates a steering rod connected to the rod 9 by means of a suitable clamp or bracket 11, the end 12 of the rod 10 being connected to the steering post (not shown).

In the form shown, the axle 6 consists of an I beam in cross-section to the front portion of which is placed wooden strips 14 for purposes hereinafter referred to. 15 designates a flat spring, the ends of which are curved as indicated at 16, the spring being held firmly in place on the axle by means of U bolts 17 which clamp the curved ends 16 of the spring in the channel 18 of the axle. The ends of the clamps 17 extend through plates 19 which are placed upon the strips 14, suitable nuts 20 being threaded on the ends of the clamps 17 to securely clamp the spring in place on the axle and prevent longitudinal movement of the spring thereon. 22 designates an arm having a longitudinal slot 23 formed therein and having a head 24 formed on the forward end of the arm, the head being seated against the spring 15 at the central portion thereof and being prevented from vertical movement on the spring by means of a U shaped clip 26 which extends around the spring and over and below the axle, being held thereon by means of a bolt 27, the bolt 27 passing through a recess or depression 28 formed in the front face of the head 24. The engagement of the head by the bolt 27 prevents the head 24 from moving longitudinally on the spring, but allows a slight rocking action of the head on the spring.

The arm 22 is securely held in place with the head 24 in engagement with the bolt 27 by means of a U bolt 30, the closed end 31 of which extends through the slot 23 in the arm and engages the front end of such slot to hold the arm in place. The ends of the U bolt 30 extend forwardly above and below the axle 6 and through a plate 32 which is provided with a rounded face 33 seated in a rounded depression formed in the outer strip of timber 14. The forward ends of the U bolt 30 are threaded to receive nuts 35 which firmly clamp the plate 32 in position also clamps the arm 22 on the spring as heretofore referred to.

38 designates a bolt which extends through the slot 23 in the arm 22, being supported in any suitable form of clamp 39 on the equalizing rod 9. The clamp is held firmly in place on such rod 9 so that any lateral movement of the rod 9 is transmitted through the bolt 38 to the arm 22.

In assembling the attachment, the wheels 5 are adjusted by the steering mechanism so that they are in straightforward position, and when in such position the bolt 38 is placed in the slot 23 of the arm 22 and clamped to the equalizing rod 9. It is preferable to have the spring 15 sufficiently strong to substantially hold the wheels 5 in straightforward position if the driver removes his hands from the steering wheel, but it is understood that the wheels 5 may be readily turned through the steering gear by the driver operating the steering wheel for the purpose of steering the vehicle. The movement of the equalizing rod 9 laterally either through the medium of the steering wheel or through unevenness of the road acting through the wheels 5 tends to swing the arm 22, and any such movement of the arm, as for example into the dotted line position shown in Fig. 4, depresses the spring thereby placing a tension on the spring which tends to cause the arm 22 to move into its original or central position. In any such movement of the arm 22 the U bolt 30 swings with the rounded face of the plate 32 as its axis, the head 24 being prevented from creeping on the spring by means of the bolt 27 hereinabove referred to.

What I claim is:—

1. A steering gear attachment adapted to be secured to the front axle of an automobile and to put a spring tension upon the equalizing rod of said automobile, comprising a flat spring member secured at its ends to the front axle, a slotted arm extending rearwardly from said spring, a head formed on said arm seated against said spring, means on said spring for preventing longitudinal movement of the head on said spring, a U bolt having its closed end extending through the slot in said arm, means for clamping said U bolt over said axle, and means on said equalizing rod for engaging said arm.

2. A steering gear attachment adapted to be secured to the front axle of an automobile and to put a spring tension upon the equalizing rod of said automobile, comprising a flat spring member secured at its ends to the front axle against longitudinal movement thereon, an arm extending rearwardly from said spring, said arm having an opening therein, a U bolt on said axle extending through the opening in said arm for holding said arm in engagement with said spring, and means on the equalizing rod for engaging said arm.

3. A steering gear attachment adapted to be secured to the front axle of an automobile and to put a spring tension upon the equalizing rod of said automible, comprising a flat spring member secured at its ends to the front axle against longitudinal movement thereon, a slotted arm extending rearwardly from said spring, a U bolt extending over said axle and engaging said arm, means for pivotally mounting said U bolt on said axle, and means on said equalizing rod engaging said arm.

4. A steering gear attachment adapted to be secured to the front axle of an automobile and to put a spring tension upon the equalizing rod of said automobile, comprising a flat spring member secured at its ends to the front axle, a slotted arm extending rearwardly from said spring, a head formed on said arm seated against said spring, said head having a vertical recess therein, a clip extending over said spring, a bolt in said clip extending through the recess in the head on said arm, a U bolt having its closed end extending through the slot in said arm, the front ends of said U bolt extending over and below said axle, a plate through which the free ends of said U bolt extend, and nuts on the free ends of said U bolt for securing the U bolt in place, a wooden member between said plate and said axle having a depression formed therein, said plate having a rounded face extending into said depression, and a bolt secured to said equalizing rod extending into the slot in said arm.

In testimony whereof, I have hereunto set my hand at Los Angeles, California, this 27th day of May, 1918.

WILLIAM GUMMERSON.

Copies of this patent may be obtained for five cents each, by addressing the "Commissioner of Patents, Washington, D. C."